United States Patent [19]
Yamamoto

[11] Patent Number: 6,052,602
[45] Date of Patent: Apr. 18, 2000

[54] METHOD AND APPARATUS FOR SELECTING A BASE STATION BASED ON A TIMING VALUE OBTAINED FROM A SYSTEM TIMING SIGNAL

[75] Inventor: Katsuya Yamamoto, Kanagawa, Japan

[73] Assignee: Sony Corporation, Tokyo, Japan

[21] Appl. No.: 08/966,179

[22] Filed: Nov. 7, 1997

[30] Foreign Application Priority Data

Nov. 11, 1996  [JP]  Japan .................................. 8-315456

[51] Int. Cl.⁷ .................................................. H04Q 7/32
[52] U.S. Cl. ........................... 455/525; 370/350; 455/550
[58] Field of Search .................... 455/525, 422, 455/432, 443, 517, 550, 575; 370/350; 375/365, 367

[56] References Cited

U.S. PATENT DOCUMENTS

| | | | |
|---|---|---|---|
| 5,509,016 | 4/1996 | Muller | 370/95.3 |
| 5,644,590 | 7/1997 | Sugita | 455/226.2 |
| 5,737,330 | 4/1998 | Fulthorp | 455/525 |
| 5,809,430 | 9/1998 | D'Amico | 455/525 |
| 5,828,659 | 10/1998 | Teder et al. | 455/67.6 |
| 5,875,402 | 2/1999 | Yamawaki | 455/525 |

*Primary Examiner*—Edward F. Urban
*Attorney, Agent, or Firm*—Jay H. Maioli

[57] ABSTRACT

A base station selecting method, a reference signal receiving method, and a subscriber apparatus by which base stations to be monitored can be efficiently selected with a simple structure, wherein a pilot signal detector includes a counter member for counting prescribed time information; a selecting member for selecting a base station for detecting a pilot signal for each frame forming a spectrum diffusion signal based on the value of the time information; and a detecting member for detecting the timing of the pilot signal transmitted from the base station selected by the selecting member. The base stations are selected for each frame based on the prescribed time information and the timings of the selected base stations are detected. Therefore, the number of the base stations to be monitored during a detection of a timing for one can be minimized as required and a consumed electric power corresponding to the number of times of the detection of timings can be lowered.

13 Claims, 2 Drawing Sheets

METHOD AND APPARATUS FOR SELECTING A BASE STATION BASED ON A TIMING VALUE OBTAINED FROM A SYSTEM TIMING SIGNAL

BACKGROUND OF THE INVENTION

1. Field of the Invention

This invention relates to a base station selecting method, a reference signal receiving method and subscriber apparatus, and more particularly, is applicable to a pilot signal detector, a pilot signal detecting method and a mobile communication terminal equipment which are used in a mobile communication system for carrying out a communication by, for example, a code division multiple access (CDMA) method.

2. Description of the Related Art

Conventionally, when one base station is shared with many subscribers to carry out a communication, there have been utilized technical methods such as a frequency division mode, a time-division multiplex mode and, a code division multiple access mode, in order to avoid the interference between the communication lines of the respective subscribers. These methods respectively have advantages and disadvantages and are respectively selected depending on the purpose of the communication system.

For example, according to the code division multiple access (referred to as a CDMA (Code Division Multiple Access), hereinafter) method, specific codes (referred to as a PN (Pseudo random noise sequence) code, hereinafter) assigned for respective lines are employed so that the modulated waves of the same carrier frequency are diffused to a band wider than an original frequency band (this is called a spectrum diffusion, hereinafter) and the respective modulated waves subjected to a spectrum diffusion processing are multiplexed and the obtained multiplexed modulated waves are transmitted. Further, the received spectrum diffusion signals are respectively synchronized with the PN code supplied through a line to be demodulated Thus, only a desired line is identified.

Specifically stated, a transmitter side initially assigns different PN codes to respective lines. In this case, the PN code is composed of a series of pseudo random number codes. The transmitter side respectively multiplies the modulated waves transmitted through the respective lines by respectively different PN codes and the obtained modulated waves are subjected to a spectrum diffusion processing. In this connection, the respective modulated waves are subjected to a prescribed modulation processing before they undergo the spectrum diffusion processing. In this way, the modulated waves respectively subjected to the spectrum diffusion processing are multiplexed and the obtained multiplexed modulated waves are transmitted.

Then, in a receiver side, the receiving signals transmitted from the transmitter side are respectively synchronized with and multiplied by a PN code the same as that assigned to the line to be demodulated. Thus, only the modulated wave transmitted through an object line is demodulated.

In this manner, according to the CDMA mode or method, only when the same PN code is commonly set to the transmitter side and the receiver side, a communication can be directly carried out there between for each call. Further, according to the CDMA mode or method, since the respectively different PN codes are employed for respective lines so that the modulated waves are subjected to a spectrum diffusion processing, the receiver side can demodulate only the spectrum diffusion signal transmitted through a line to be demodulated. Still further, since the PN code is composed of a series of pseudo random number codes, it may be said that the CDMA mode is excellent in secrecy.

Besides, according to a mobile communication system using the CDMA mode or method, the base stations of a transmitter side repeatedly transmit PN codes (called a pilot signal, hereinafter) in order to obtain and maintain the synchronization of a subscriber side and reproduce clocks. The subscriber of a receiver side detects the respective pilot signals transmitted from a plurality of base stations and assigns the detected timings respectively to demodulators. In this case, the subscriber generates the PN codes in the respective demodulators. The demodulators respectively multiply the PN codes by a spectrum diffusion signal transmitted from an object base station at timings respectively assigned to the demodulators to thereby demodulate appropriately the spectrum diffusion signal.

Specifically described, according to the mobile communication system utilizing the CDMA mode or method, the respective base stations transmit the PN codes with respectively different timings as the pilot signals. The subscriber side detects the timing of the pilot signal supplied from the object base station, and synchronizes the PN code generated in the demodulator with the timing, so that the subscriber can properly demodulate only the spectrum diffusion signal transmitted from the target base station.

Parenthetically, as described above, the respective base stations transmit the PN codes at respectively different timings, however, the PN codes themselves are respectively formed in the same code pattern. In other words, the differences in timing between the different pilot signals for the respective base stations directly correspond to the differences between the PN codes.

In the meantime, the above mentioned subscriber carries out a mobile communication, so that it moves while it switches base stations as objects to communicate with the subscriber. Such a switching of the base stations is called a hand-off. In order to achieve an efficient hand-off, the subscriber is designed to continuously monitor the timings of the pilot signals of base stations (referred to as adjacent base stations, hereinafter) except a base station which is an object to currently communicate with the subscriber.

According to the CDMA mode or method, the adjacent base stations are monitored by detecting the timings of the pilot signals, that is, phases. Thus, the base stations to be monitored are divided into groups based on a prescribed priority for monitoring to apply a proper system to these base stations.

However, it has been inconvenient that a specific standard for selecting base stations to be monitored is not stipulated in the CDMA mode or method. Therefore, it has been necessary to obtain a simple and efficient method and apparatus for selecting a base station to be monitored in order to lower the power consumption of a subscriber.

SUMMARY OF THE INVENTION

In view of the foregoing, an object of this invention is to provide a base station selecting method, a reference signal receiving method and a subscriber apparatus by which a base station to be monitored can be efficiently selected with a simple structure.

The foregoing object and other objects of the invention have been achieved by the provision of a base station selecting method for a cellular system, in a subscriber which receives a reference signal from base stations and demodulates based on the reference signal. The base station selecting method comprises: a timing information pick up step for picking up timing information from received reference signal; a selecting step for selecting predetermined one base station from the base stations corresponding to the timing information; and a reference signal receiving step for receiving reference signal from the predetermined one base station.

Further, according to this invention, in a subscriber which receives a reference signal from base stations and demodulates based on the reference signal, a reference signal receiving method for a cellular system comprises: a timing information pick up step for picking up timing information from received reference signal; a selecting step for selecting plural receiving timings of different phases from the timing information; and a reference signal receiving the step for receiving reference signal on each of the plural receiving timings.

Further, according to this invention, a subscriber apparatus in a cellular system, receiving a reference signal from base stations and selecting a base station based on the reference signal, comprises: receiving a means for receiving radio frequency signal; timing information pick up means for picking up timing information from an output signal of the receiving means; base station selecting a means for selecting predetermined one base station from the base stations corresponding to output signal of the timing information pick up means for one of received plural timing information of different phases; and reference signal demodulating a means for demodulating reference signal from the predetermined base station.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
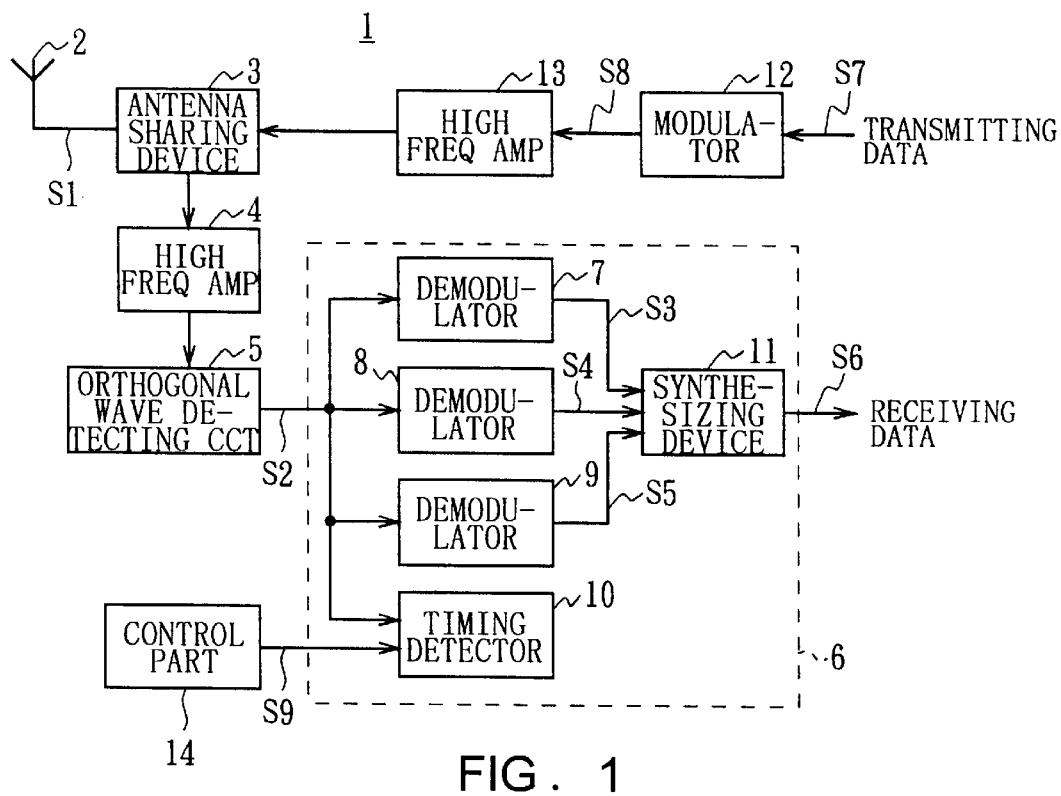
FIG. 1 is a block diagram showing the construction of a subscriber apparatus according to an embodiment of the present invention.

Preferred embodiments of this invention will be described with reference to the accompanying drawings:

Referring to FIG. 1, reference numeral 1 generally designates a subscriber apparatus which serves to receive signals transmitted from a plurality of base stations by using a CDMA (Code Division Multiple Access: code division multiplex) mode or method. The respective base stations transmit data generated by multiplying PN codes (Pseudo random noise sequence) codes with respectively different timings together and applying a spectrum diffusion processing (not shown) to the multiplied PN codes.

The subscriber apparatus 1 receives the transmit data transmitted from the respective base stations and demodulates received signals by employing the timings of pilot signals included in the received signals. Thus, the subscriber apparatus 1 can demodulate only the received signal received from the base station to be demodulated. In this connection, the pilot signal is composed of the repeated pattern signal of the PN codes with respectively different timings which are transmitted by the base stations of a transmitter side and employed for obtaining and maintaining the synchronization of a subscriber side and reproducing clocks.

The subscriber apparatus 1 converts a received signal S1 received by an antenna 2 into a baseband signal S2 sequentially through an antenna sharing device 3, a high frequency amplifier 4 and an orthogonal detector circuit 5. The obtained baseband signal S2 is A/D converted (not shown) and the thus obtained signal is supplied to a receiver 6. The receiver 6 serving as a receiving means inputs the supplied baseband signal S2 to demodulators 7, 8 and 9 serving as demodulating means and to a timing detector 10 serving as a pilot signal detecting means, The timing detector 10 detects pilot signals transmitted by the base stations from the baseband signal S2. Further, the timing detector 10 respectively assigns timings based on the pilot signals thus detected to the demodulators 7, 8 and 9. The demodulators 7, 8 and 9 demodulate the baseband signal S2 at timings respectively assigned thereto and send the respectively obtained demodulated signals S3, S4 and S5 to a synthesizing device 11.

More specifically described, the demodulators 7, 8 and 9 respectively generate PN codes, and multiply the PN codes by the baseband signal S2 at the above mentioned timings, so that the baseband signal S2 is demodulated. The respective base stations transmit the timings of the PN codes at timings respectively peculiar to the base stations. Accordingly, the timings exhibited by the pilot signals are synchronized with those of the PN codes and the baseband signal S2 is demodulated by using the synchronized PN codes, so that only a signal transmitted from the base station to be demodulated can be selectively demodulated. In this case, a processing that the timings shown in the pilot signals are synchronized with the timings of the PN codes generated in the demodulators as mentioned above is referred to as a lock.

Herein, the demodulators 7, 8 and 9 demodulate the supplied baseband signal S2 by employing the PN codes with respectively different timings. That is, signals transmitted from the base stations are not only those received through transmission paths having a constant propagation path length, but also those, for example, reflected on the obstructions such as buildings, and received by a receiver through transmission paths having respectively different lengths. A plurality of reflected waves received through a plurality of transmission paths in such a manner are called a multipass. Actually, since the multipass usually exists, the receiver 6 is provided with the demodulators 7, 8 and 9 and actuates them depending on the number of passes and the number of the base stations from which signals can be received. In this case, the received signal S1 received through transmission paths including three paths (namely, under states in which only timings are different) is demodulated respectively by the demodulators 7, 8 or 9.

The synthesizing device 11 inputs and synthesizes the demodulated signals S3, S4 and S5 obtained from the multipass mentioned above. At this time, since the demodulated signals S3, S4 and S5 are demodulated at respectively different timings, the synthesizing device 11 synchronizes mutually the timings of the demodulated signals S3, S4 and S5 and then synthesizes together the demodulated signals. The synthesizing device 11 synthesizes together the demodulated signalsS3, S4 and S5, so that it can generate receiving data S6 large in ratio to noise and in ratio to interference and outputs the receiving data S6 thus obtained.

In this connection, the subscriber apparatus 1 is also provided with a circuit for a transmitting system which serves to supply transmitting data S7 to a modulating part 12 and apply the quadrature phase shift keying (QPSK) to the data, thereafter a spectrum diffusion is applied to the data. The subscriber apparatus 1 amplifies a modulated signal S8 thus produced in the modulating part 12 in a high frequency amplifier 13, and transmits the amplified modulated signal through the antenna sharing device 3 and the antenna 2, sequentially.

Further, a control part 14 serving as a counter means is connected to the timing detector 10. The control part 14 is designed to generate time information S9 as a counter value and supply the time information to the timing detector 10. The timing detector 10 monitors the timings of adjacent base stations or the like based on the time information S9 and decides timings newly assigned to the demodulators 7, 8 and 9 during the hand-off time.

The control part 14 uses, for example, a system time as the time information S9. The system time indicates reference time information in an IS-95 system standardized in the United States, and an absolute time in which Jan. 6, 1980 is considered as a reference. In the IS-95 system, the base station is designed to transmit the system time through a control channel.

The subscriber apparatus 1 serving as a subscriber, when a power is turned on, detects the timing (PN code) of a desired base station and begins to update the counter value of the control part 14 at the timing. After that, the subscriber apparatus 1 receives the control channel of the base station in question to detect the system time and initializes the counter value of the control part 14 by the obtained value. The subscriber apparatus 1 initializes the counter value in this manner, and maintains and updates the system time by the counter value of the control part 14 after it shifts to a waiting state. In the IS-95 system, the system time is employed for determining an intermittent operation timing during a waiting state, deciding a message transmitting timing in the control channel and designating the time of a hand-off or the like.

A system time transmitted from the base station side represents a counter value by taking 36 bits as one unit, which is updated every 80 [ms]. In this case, since the value of 20 [ms] may be used as the value of a unit in terms of the standard of call control in the IS-95, the subscriber side extends and adds least significant two bits to the value so that 38 bits is taken as one unit, this value is updated every 20 [ms] and the system time of 20 [ms] unit is obtained.

Figure 2:
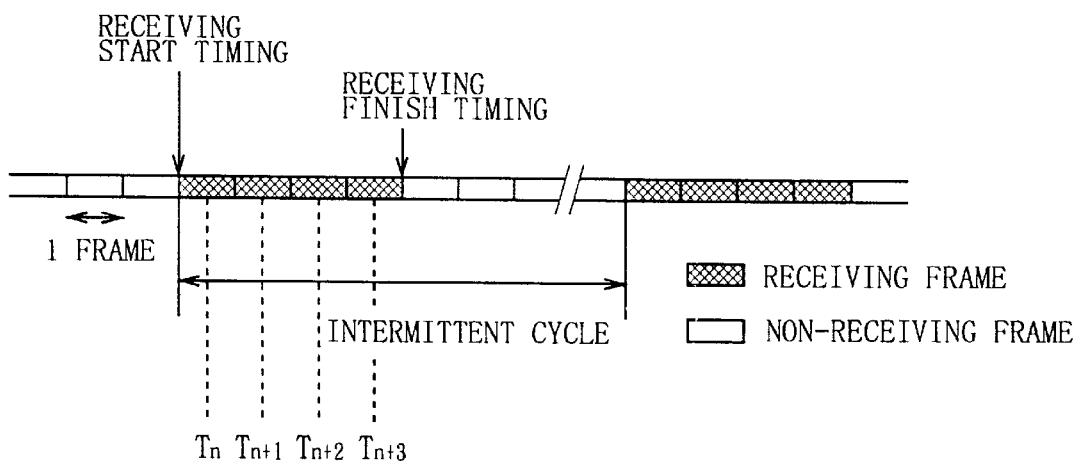
FIG. 2 is a schematic view for explaining the state of system time under a waiting state.

FIG. 2 illustrates a system time condition in the intermittent receiving during a waiting state. A receiving frame shown in FIG. 2 receives four times on the basis of 20 [ms] unit. Subsequent calls are allocated to the receiving frames of other subscribers. For example, when it is assumed that an intermittent cycle in the figure is 1.23 [S], sixteen subscribers are respectively allocated to the cycle and 80 [ms] thereof is receiving timings given to arbitrary subscribers.

As illustrated in this figure, one unit of the receiving frame represents a timing which coincides with the update of the system time with 20 [ms] unit obtained by updating the above described least significant two bits. The IS-95 system specifies that the system time indicates a value divided out by four upon start of receiving at the above described intermittent operation timing. Therefore, "Tn" shown in FIG. 2 designates a multiple of four. As apparent from the above description, a receiving timing during an intermittent receiving operation can be classified into four types including 0, 1, 2 and 3, when it is assumed that the system time is constituted of a remainder system of four.

The subscriber apparatus 1 is designed to monitor the timings of the adjacent base stations by employing the above mentioned system time.

Figure 3:
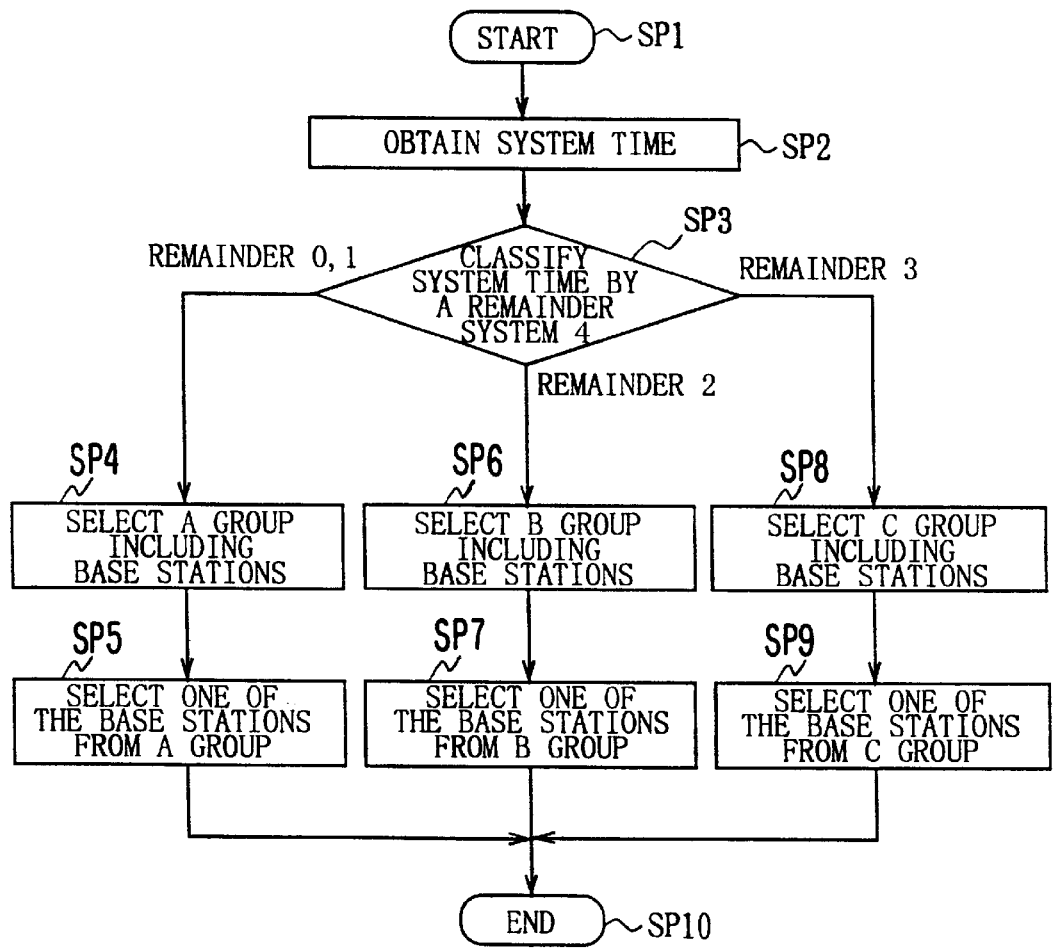
FIG. 3 is a flowchart for explaining a method for detecting a pilot signal according to the embodiment of the invention.

A specific timing monitor processing is carried out in accordance with a procedure described below. Namely, as illustrated in FIG. 3, the subscriber apparatus 1 initially starts the procedure at step SP1. The subscriber apparatus 1, which detects the receiving frame from the base station side during a waiting state, performs a processing corresponding to the receiving frame, and then gets the system time at step SP2. More specifically, the timing detector 10 reads counter value of the system time generated by the control part 14.

Next, the subscriber apparatus 1 computes the least significant two bits of the obtained system time so that it calculates the remainder system of four at step SP3. The subscriber apparatus 1 determines the base station to be monitored based on the remainder calculated in such a way.

Herein, the base station to be monitored during a waiting state can be sorted into three groups. That is, the three groups include an A group which has base stations from which the subscriber apparatus currently receives calls, a B group which is mentioned as adjacent base stations from the currently receiving base stations and a C group which has base stations other than the above described base stations. The subscriber apparatus 1 considers the sequence of A, B and C to be a priority for monitoring the base stations. When the remainder obtained at the step SP3 is 0 for 1, the processing advances to step SP4. When the remainder is 2, the processing advances to step SP6. When the remainder is 3, the processing branches and proceeds to step SP8, respectively.

When the remainder got in the step SP3 is 0 and 1, the subscriber apparatus 1 selects the A group as the base stations to be monitored at the step SP4. Then, the subscriber apparatus 1 selects one base station from the A group and detects its timing (monitor) at step SP5.

Further, when the remainder obtained at the step SP3 is 2, the subscriber apparatus 1 selects the B group as the base stations to be monitored at the step SP6. Then, the subscriber apparatus 1 selects one base station from the B group and detects its timing (monitor) at step SP7.

Still further, when the remainder got at the step SP3 is 3, the subscriber apparatus 1 selects the C group as the base stations to be monitored at the step SP8. Then, the subscriber apparatus 1 selects one base station from the C group and detects its timing (monitor) at step SP9.

In any case of the steps SP5, SP7, and SP9, when the detection of the timing of the selected base station is completed, the procedure is finished at step SP10. When the receiving frame is detected, thereafter, the processing is returned to the step SP2 to repeat the procedure. The subscriber apparatus 1 is designed to store the base stations whose timings are detected by the control part 14 for each of the groups, and detect the timings of different base stations by referring to the memory during the next detection of timings (steps SP5, SP7 and SP9). In the case of the A group, since it includes the base stations from which the subscriber apparatus currently receives a call, there exists only one base station which is registered. Accordingly, only in this case, the timing of the same base station is detected every time until the base station from which the subscriber apparatus receives a call is changed.

With the above described construction, the subscriber apparatus 1 generates, maintains and updates the system time S9 by the control part 14.

The system time S9 represents a counter value formed with a value which is synchronized with and coincides with the reference time information transmitted by the base station, and is updated at a timing that coincides with the transmitting timing of each of frames transmitted to the subscriber apparatus 1 from the base station.

The subscriber apparatus 1 divides the base stations to be monitored into the three groups of A, B and C depending on the priority and assigns each of the groups to each of the remainders gained by dividing the value of the system time S9 by four. The subscriber apparatus 1 calculates the remainder system of four for the value of the least significant two bits of the above described system time S9 every timing of the frames received from the base station, that is, every 20 [ms]. Then, the subscriber apparatus 1 selects one of the respective groups A, B and C depending on the obtained value, detects the timing of one base station of the selected group and shifts to a low power consumption mode after the detection is completed.

As mentioned above, the system time is essential information in a communication. The subscriber apparatus 1 usually assuredly generates the system time. The subscriber apparatus 1 selects the base station to be monitored based on the system time, and shifts to the low power consumption mode after the subscriber apparatus1 detects the timing of the selected base station. Thus, the subscriber apparatus can easily select the base station to be monitored with a simple structure and reduce a consumed power.

According to the construction mentioned above, since the system time S9 which is the reference time information is generated by the control part 14, the base station to be monitored is selected based on the system time S9 for each of the frames received during a waiting state, and the subscriber apparatus shifts to a low power consumption mode until a next received frame after the subscriber apparatus detects the timing of the selected base station, the base station to be monitored can be readily selected without providing a large amount of additional construction. Accordingly, the subscriber apparatus 1 with a simple structure which can efficiently select the base stations to be monitored can be realized.

Although, in the above described embodiment, an example of the receiver 6 and the subscriber apparatus 1 having three demodulators 7, 8 and 9 is explained, it is to be understood that the present invention is not limited to this form, but may be applied to a receiver and a subscriber apparatus having, for example, five demodulators. In other words, demodulators for demodulating signals received from the base stations by using a plurality of demodulators based on the CDMA mode or method may be utilized regardless of the number thereof.

Further, although, in the above described embodiment, an example in which the present invention is applied to the subscriber apparatus 1 having both a receiving function and a transmitting function is explained, it is to be noted that the present invention is not limited to this example, but may be applied to the subscriber apparatus 1 having only the receiving function.

Still further, although, in the above mentioned embodiment, the subscriber apparatus 1 which selects the base stations to be monitored during a waiting state, namely, during an intermittent receiving operation, is explained, it is to be recognized that the present invention is not limited thereto, but may be applied to a subscriber apparatus which selects the base station to be monitored during a continuous reception, for example, during a speech. In this case, since a group which the subscriber side can decide to be demodulated is added to the A group from which the calls are currently received, the B group registered as the adjacent base stations and the C group except them, the respective groups of the base stations are redefined and a method for adopting the remainder system to determine timings for selecting the respective groups is changed so that the above stated example may meet the method for selecting the base stations to be monitored according to the embodiment of the present invention.

Besides, although, in the above described embodiment, the subscriber apparatus 1, is explained, which decides as the base stations to be monitored, the A group including the base stations from which the subscriber currently receives calls when the remainder got by dividing the least significant two bits of the system time by four is 0 and 1, the B group including the base stations registered as the adjacent base stations when the remainder is 2, and the C group including the base stations except those of the A or B group when the remainder is 3, it is to be noted that the present invention is not limited thereto. The present invention may be applied to, for example, a subscriber apparatus which decides as the base stations to be monitored, the A group including the base stations from which the subscriber currently receives calls when the remainder obtained by dividing the least significant two bits of the system time by 4 is 0, the B group including the base stations registered as the adjacent base stations when the remainder is 1 or 2, and the C group including the base stations except those of the A or B group when the remainder is 3.

Furthermore, although, in the above described embodiment, the control part 14, is explained, which maintains and updates all the 38 bits serving as one unit of the system time, as a counter value, it will be noted that the present invention is not limited thereto. But, for example, only some of the least significant bits may be actually counted and the remaining most significant bits may be stored in terms of software.

As stated above, according to the present invention, there are provided a counter member for counting prescribed time information; a selecting member for selecting the base station for detecting the pilot signal for each frame forming a spectrum diffusion signal based on the value of the time information; and a detecting member for detecting the timing of a pilot signal transmitted from the base station selected by the selecting member, so that the base station is selected for each frame based on the prescribed time information and the timing of the selected base station is detected. Therefore, the number of the base stations to be monitored during the detection of a timing can be minimized as required. Thus, the pilot signal detector, the pilot signal detecting method and the mobile communication terminal equipment by which the base stations to be monitored can be efficiently selected with a simple structure can be realized.

While the above description has been presented in connection with the preferred embodiments of the invention, it will be obvious to those skilled in the art that various changes and modifications may be made, so it is an aim therefore, to cover in the appended claims all such changes and modifications as fall within the true spirit and scope of the invention.

What is claimed is:

1. In a cellular system subscriber apparatus that receives a reference signal from base stations and demodulates incoming calls based on said reference signal, a base station selecting method comprising the steps of:

obtaining a system time from a system time signal transmitted from a base station over a control channel and producing a corresponding timing value;

dividing the timing value by a predetermined integer;

selecting one base station from said base stations based on a value, including zero, of a remainder after performing division in said step of dividing; and receiving the reference signal from said one base station selected in said step of selecting.

2. The base station selecting method as claimed in claim 1, wherein said cellular system uses a CDMA format.

3. The base station selecting method as claimed in claim 2, wherein a reference time length for picking up in said timing information pick up step is 4 terms of a predetermined unit time.

4. The base station selecting method as claimed in claim 1, further comprising the step of executing said selecting step in an interval receiving mode.

5. In a cellular system subscriber apparatus that receives a reference signal from base stations and demodulates incoming calls based on said reference signal, a reference signal receiving method comprising the steps of:

obtaining a system time from a system time signal transmitted from a base station over a control channel and producing a corresponding timing value;

dividing the timing value by a predetermined integer;

selecting a plurality of receiving timings of different respective phases from said timing information based on a value, including zero, of a remainder after performing division in said step of dividing; and a reference signal receiving step for receiving a reference signal at each of said plurality of receiving timings.

6. The reference signal receiving method as claimed in claim 5, wherein said cellular system uses a CDMA format.

7. The reference signal receiving method as claimed in claim 6, wherein a reference time length for picking up in said timing information pick up step is 4 terms of a predetermined unit time.

8. The reference signal receiving method as claimed in claim 5, further comprising the step of executing said reference signal receiving step using a plurality of demodulators.

9. Subscriber apparatus for use in a cellular system for receiving a reference signal from a plurality of base stations and selecting one base station from said plurality of base stations based on said reference signal, the apparatus comprising:

receiving means for receiving a radio frequency signal;

timing information pick up means for picking up timing information from an output signal of said receiving means including means for obtaining a system time signal transmitted from a base station over a control channel and producing a corresponding time value for division by a predetermined integer;

base station selecting means for selecting one base station from said plurality of base stations in response to a value, including zero, of a remainder of the division performed in said timing information pick up means representing one of a plurality of received timing information of different phases; and reference signal demodulating means for demodulating the reference signal from said one base station selected by said base station selecting means.

10. The subscriber apparatus as claimed in claim 9, wherein said cellular system uses a CDMA format.

11. The subscriber apparatus as claimed in claim 9, wherein said reference signal demodulating means comprises a plurality of demodulators.

12. The subscriber apparatus as claimed in claim 9, wherein said selecting operation executed by said base station selecting means is executed in a term of an interval receiving mode.

13. The subscriber apparatus as claimed in claim 10, wherein a reference time length for picking up timing information by said timing information pick up means is 4 terms of a predetermined unit time.

* * * * *